US006206229B1

(12) United States Patent
Harjes

(10) Patent No.: US 6,206,229 B1
(45) Date of Patent: Mar. 27, 2001

(54) DRINKING CUP WITH DEPRESSIBLE BUTTONS

(76) Inventor: Ross B. Harjes, P.O. Box 2117, Madison, MS (US) 39130

( * ) Notice: Subject to any disclaimer, the term of this patent is extended or adjusted under 35 U.S.C. 154(b) by 0 days.

(21) Appl. No.: 09/584,361

(22) Filed: Jun. 1, 2000

(51) Int. Cl.7 ...................................................... B65D 3/00
(52) U.S. Cl. .......................... 220/669; 220/705; 229/400; 229/404
(58) Field of Search .................................. 220/669, 674; 229/400, 404, 705

(56) References Cited

U.S. PATENT DOCUMENTS

| | | | |
|---|---|---|---|
| 3,157,335 | * 11/1964 | Maier | 229/400 |
| 3,208,631 | * 9/1965 | Edwards | 229/400 X |
| 3,401,862 | * 9/1968 | Wanderer | 229/400 |
| 3,974,916 | * 8/1976 | Bartolucci | 229/404 X |
| 4,111,303 | * 9/1978 | Compton | 229/400 X |
| 5,762,230 | * 6/1998 | Policappelli | 220/669 X |
| 6,123,219 | * 9/2000 | Cornell et al. | 220/705 |

* cited by examiner

Primary Examiner—Steven Pollard
(74) Attorney, Agent, or Firm—Patent & Trademark Services; Joseph H. McGlynn

(57) ABSTRACT

A drinking cup with a reusable indicator which indicates the number of times the cup has been filled.

11 Claims, 1 Drawing Sheet

DRINKING CUP WITH DEPRESSIBLE BUTTONS

BACKGROUND OF THE INVENTION

This invention relates, in general, to drinking cups, and, in particular, to drinking cups with an indicator to indicate the number of times the cup has been filled.

DESCRIPTION OF THE PRIOR ART

In the prior art various types of indicators have been proposed. For example, U.S. Pat. No. 5,421,286 to McLean discloses a disposable shaver with depressible blisters to determine the number of times the razor has been used.

U.S. Pat. No. 3,974,729 to Bartolucci discloses a lid for a cup which has depressible blisters for identifying the contents of the cup.

U.S. Pat. No. 4,974,729 to Steinnagel discloses a calendar type dispenser which has indicia for reminding a user when a particular medicine is to be taken.

U.S. Pat. No. 5,169,001 to Scheibel discloses a basket for holding a plurality of medications and having a plurality of cards with indicia indicating when the medication should be taken

SUMMARY OF THE INVENTION

The present invention is directed to a drinking cup with a reusable indicator which indicates the number of times the cup has been filled.

It is an object of the present invention to provide a new and improved drinking cup.

It is an object of the present invention to providea new and improved drinking cup with a visual indicator to indicate the number of times the cup has been filled.

It is an object of the present invention to providea new and improved drinking cup which is disposable.

These and other objects and advantages of the present invention will be fully apparent from the following description, when taken in connection with the annexed drawings.

DESCRIPTION OF THE PREFERRED EMBODIMENT

Figure 1:
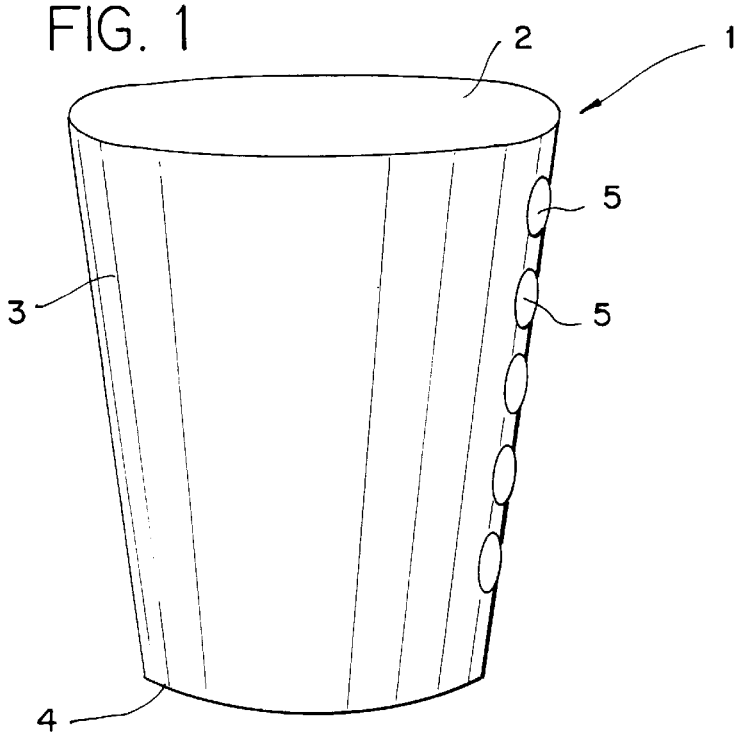
FIG. 1 is a perspective view of a drinking cup incorporating the present invention.

Referring now to the drawings in greater detail, FIG. 1 shows a perspective view of the drinking cup of the present invention 1. The cup 1 has an open top 2 sides 3 and a closed bottom 4. It should be noted that while the cup 1 is shown as being circular, other shapes can be used without departing from the scope of the present invention. Also, while the cup 1 of the present invention is designed as a disposable cup, non-disposable cups could also be used without departing from the scope of the invention.

Disposed along at least one area of the sides 3 is a line of depressible buttons 5. These buttons are similar to the depressible buttons 20, 22, 24, and 26 disclosed in U.S. Pat. No. 3,974,916 to Bartolucci, which is hereby incorporated by reference.

While people who, for health or dietary reasons, must drink a certain number of glasses of liquids each day, there has never been a convenient way of keeping track of the number of glasses or cups of liquid that have been consumed. The present invention solves this problem by providing the cup1 with a plurality of depressible buttons 5 on an outside surface of the cup. One button5 will be depressed each time the cup is filled, and in this way, the user will have an accurate count of the number of times the cup has been refilled.

Figure 2:
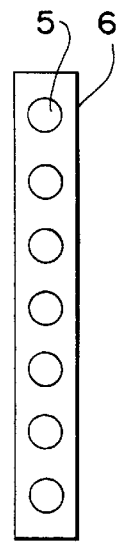
FIG. 2 is a side view of a drinking straw incorporating the present invention.

FIG. 2 shows another variation of the basic theme, except the depressible buttons 5 are incorporated into a conventional drinking straw 6. In all other respects, the buttons 5 will operate in the same manner as the FIG. 1 device.

Figure 3:
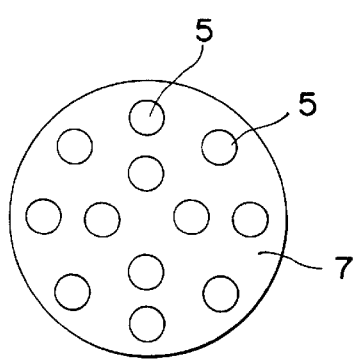
FIGS. 3–5 are plan views showing various physical arrangements of the depressible buttons of the present invention.
Figure 4:
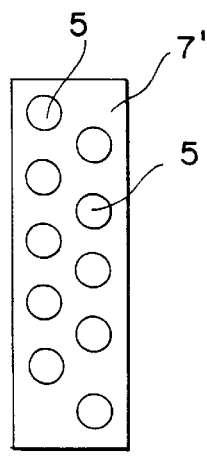
Figure 5:
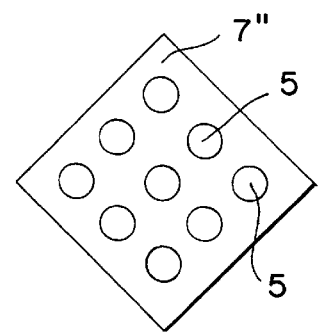

FIGS. 3–5 discloses patches 7, 7', 7" which can be secured to the cup 1 by various means. In this manner the patches which serve the same purpose as the buttons 5 in FIG. 1, do not have to be disposed of each time the cup 1 is disposed of. The patches 7, 7', 7" cab be removed from one cup when that cup is disposed of and placed on another cup and reused over and over. The patches 5 can be secured to the cup in a variety of ways depending on what material the cup is made from. For example, if the cup is made from a throwaway material such as Styrofoam, a nonpermanent adhesive that will adhere to Styrofoam could be used to secure the patches 7, 7', 7" to the cup. When the cup is disposed of, the patches could be removed from the cup and easily applied to a new cup.

If the cup is made from a smooth material such as glass or ceramic, the patches could be made from a material such a s vinyl which will adhere to the glass or ceramic by means of static cling. Again, when the cup is disposed of, the patches could be removed from the cup and easily applied to a new cup. also, it should be noted that the arrangement of blisters 5 in the patches shown in FIGS. 3–5 are merely for illustrational purposes, and other arrangements could be used without departing from the scoop of the invention. In addition, the blisters 5 and/or the patches 7, 7', 7" could be made in various colors which would facilitate the user keeping track of the number of times the cup has been refilled.

Also, while the present invention has been described as being used to count the number of times the cup 1 has been refilled, other uses are available. For example, the buttons 5 could be used to count laps run or to keep game scores. In addition, the buttons 5 could be applied to a variety of articles such as, but not limited to, water glasses, water bottles and water pitchers.

Although the Drinking Cup with Depressible Buttons and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A container for liquids comprising:
    said container having an open top, a closed bottom and sides,
    means on said sides for indicating the number of times said container has been filled,
    said means comprising a plurality of raised portions,
    said raised portions being deformable and thereby being capable of selective manual deformation to alter the appearance of said raised portions.

2. The container as claimed in claim 1, wherein said raised portions have a generally domed configuration.

3. The container as claimed in claim 1, wherein said raised portions are unitary with said container.

4. The container as claimed in claim 1, wherein said raised portions are integral with said container.

5. The container as claimed in claim 4, wherein said raised portions are positioned on a patch, and means for attaching said patch to said container.

6. The container as claimed in claim 4, wherein said raised portions are arranged in a circular pattern.

7. The container as claimed in claim 4, wherein said raised portions are arranged in a staggered pattern.

8. The container as claimed in claim 4, wherein said means for attaching said patch to said container is a non-permanent adhesive.

9. The container as claimed in claim 4, wherein said means for attaching said patch to said container is static cling.

10. A container for liquids comprising:

said container having an open top, an open bottom and sides, means on said sides for indicating the number of times another container associated with said container has been filled, said means comprising a plurality of raised portions, said raised portions being deformable and thereby being capable of selective manual deformation to alter the appearance of said raised portions.

11. The container as claimed in claim 10, wherein said container is a drinking straw.

\* \* \* \* \*